United States Patent [19]

Johnston

[11] Patent Number: 4,880,981
[45] Date of Patent: Nov. 14, 1989

[54] LOW LEVEL RADIATION MEASUREMENT DEVICE

[75] Inventor: Joseph G. Johnston, Newbury, Ohio
[73] Assignee: Bicron Corporation, Newbury, Ohio
[21] Appl. No.: 166,627
[22] Filed: Mar. 11, 1988
[51] Int. Cl.$^4$ ............................................. G01T 1/17
[52] U.S. Cl. .............................. 250/369; 250/361 R; 250/370.01
[58] Field of Search .......... 250/361 R, 363 R, 370.11, 250/370.01, 369, 363.01

[56] References Cited

U.S. PATENT DOCUMENTS 4,617,680 10/1986 Johnston ............................... 377/10

OTHER PUBLICATIONS

Susumu Minato, "A New Method for Measurement of γ Ray Flux with NaI-(Tl) Scintillation Counter and Its Application to Environmental γ Radiation Analysis". Rep. Gov. Ind. Res. Inst. Nagoya(Japan) vol. 25, No. 11, (Nov. 1976), pp. 334–338.

*Primary Examiner*—Constantine Hannaher
*Attorney, Agent, or Firm*—Pearne, Gordon, McCoy & Granger

[57] ABSTRACT

A plastic scintillator element that is tissue equivalent is optically coupled to a photomultiplier tube that provides a pulse signal which contains information relating to radiation energy fluence, and having an undesirable "dark current" component. A direct current blocking element in the form of a capacitor isolates the input of an operational amplifier from the "dark current" component so that the output signal of the amplifier indicates the average current of the photomultiplier signal attributed only to detected, low level, environmental radiation in the range of 0–200 μrem/h.

6 Claims, 1 Drawing Sheet

LOW LEVEL RADIATION MEASUREMENT DEVICE

BACKGROUND OF THE INVENTION

The present invention relates in general to radiation measurement, and more particularly to the measurement of low level ionizing radiation.

There exists in the field of health physics a need to monitor low level ionizing radiation in a human environment. The presence of such environmental radiation must not only be detected. Environmental radiation must also be quantified in terms of human tissue equivalent response.

Typically, environmental radiation is measured in terms of microrems per hour ($\mu$rem/h). A usual range of measurement is 0–200 $\mu$rem/h. The radiation monitored is typically gamma and x-ray radiation from approximately 40 keV to 1.2 Mev.

Environmental radiation measurements allow a health physicist to determine the relative safety of human environments, and to correct problems of, for example, low level radiation contamination.

It is well known in the art that an ion chamber is a good radiation measurement device from the standpoint of tissue equivalent response. However, a typical air-filled ion chamber that is vented to the atmosphere cannot successfully measure environmental radiation in the 0–200 $\mu$rem/h range because of its inherently low signal-to-noise ratio. That is, the small direct current signal attributed to environmental radiation impinging on the ion chamber cannot be accurately separated from the direct current background noise of the ion chamber.

To allow the measurement of environmental radiation by use of an ion chamber, the chamber can be pressurized with a suitable gas that provides a higher direct current signal indicative of environmental radiation levels, i.e. provides a high signal-to-noise ratio. A type RSS-111-100 environmental radiation measuring instrument, manufactured and sold by Reuter-Stokes Co. of Cleveland, Ohio, incorporates such a pressurized ion chamber.

While pressurizing an ion chamber with a suitable gas does allow its use as an environmental radiation measurement device, problems do arise. A pressurized ion chamber is a sophisticated device, and hence does not easily lend itself to incorporation in lightweight, portable, radiation measuring instruments. Also, a pressurized ion chamber's accuracy is highly dependent on its maintaining pressure integrity. Even a slight loss of pressure due to a pressure leak can result in inaccurate radiation measurements. Also, the necessary thickness of the ion chamber wall which allows it to function as a pressure vessel, inherently decreases its sensitivity due to the attenuation effect of the relatively thick chamber wall.

It would be desirable to provide a non-ion chamber type instrument for accurately measuring environmental radiation in the 0–200 $\mu$rem/h range.

SUMMARY OF THE INVENTION

In accordance with the present invention, a radiation detector is provided wherein impinging radiation events generate a pulse signal having a direct current noise component.

A direct current blocking element, in the preferred form of a capacitor, filters the direct current noise component from the pulse signal wherein remaining portions of the pulse signal are integrated to provide, as a function of time, a direct current signal indicative of the average energy of the detected radiation events, i.e. the energy fluence rate.

The detector can be in the form of a tissue equivalent plastic scintillator element optically coupled to a photomultiplier tube whose "dark current" constitutes the direct current noise component.

BRIEF DESCRIPTION OF THE DRAWING

A fuller understanding of the invention may be had by referring to the following description and claims taken in conjunction with the accompanying drawing, wherein:

DETAILED DESCRIPTION OF THE PREFERRED EMBODIMENT

Figure 1:
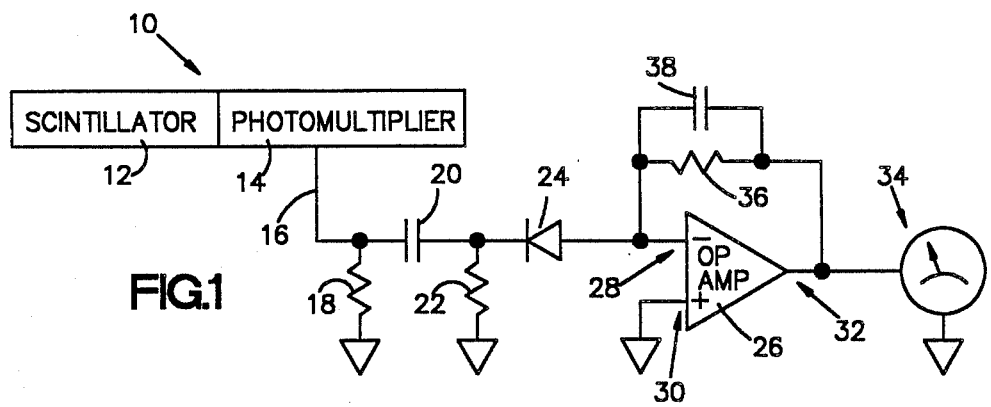
FIG. 1 is a schematic diagram of a circuit incorporating the present invention.

With reference to FIG. 1, a circuit for measuring low level environmental radiation in accordance with the present invention is schematically illustrated.

The circuit of FIG. 1 includes a radiation detector 10 primarily responsive to gamma and x-ray ionizing radiation. The detector 10 includes a scintillator element 12 optically coupled to a photomultiplier tube 14. Preferably, the scintillator element 12 is formed from an organic material that is a human tissue equivalent, radiation events or particles impinging on the scintillator element 12. For example, a styrene-based, plastic scintillator element formed from a type BC 452 plastic scintillator material, manufactured and sold by the assignee of the present invention, can be utilized. Both the scintillator element 12 and its associated photomultiplier tube 14 are conventional.

The photomultiplier tube 14 provides, on a signal line 16, a pulse signal indicative of detected impinging events as a function of time and indicative of the energy of each of the detected impinging events. The nature of the pulse signal provided via the signal line 16 will be more fully described with reference to FIGS. 2a, 2b and 2c. Connected between the pulse signal line 16, and the neutral point of the circuit of FIG. 1, is a conventional photomultiplier tube load resistor 18.

In accordance with the present invention, a capacitor 20 is series connected between the pulse signal line 16 and one end of a differentiating resistor 22 having its other end connected to the neutral point of the circuit of FIG. 1. The functioning of capacitor 20 will be subsequently discussed with regard to FIGS. 2a, 2b and and 2c.

The remaining elements of the circuit of FIG. 1 include a diode 24, an operational amplifier 26, a volt meter 34 of the D'Arsonval movement type, a feedback resistor 36, and a feedback capacitor 38. The diode 24 has its cathode connected to the interconnection point of the differentiating resistor 22 and the capacitor 20 as illustrated. The anode of the diode 24 is connected to the inverting input 28 of the operational amplifier 26, which has its non-inverting input 30 connected to the neutral point of the circuit of FIG. 1 as illustrated so as to function as a reference point. The feedback resistor 36 and feedback capacitor 38 are connected in parallel with each other and across the input 28 and the output 32 of the operational amplifier 26. The output 32 of the operational amplifier 26 drives the meter 34 in a conventional manner. It is to be noted that elements 24, 26, 34, 36 and 38 function together in a conventional manner similar to a charge pump rate meter circuit as illustrated and discussed in U.S. Pat. No. 4,617,680 owned by the assignee of the present invention and incorporated in its entirety herein by reference.

Figure 2A:
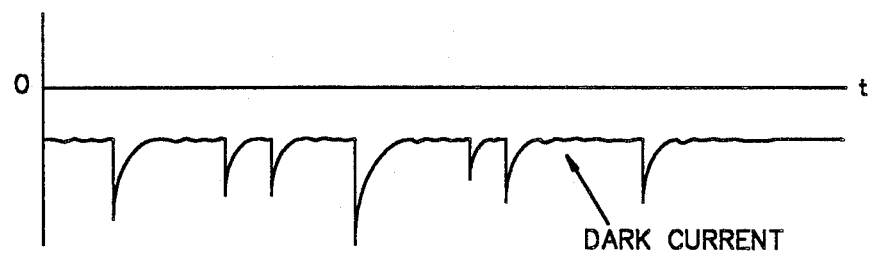
FIGS. 2a, 2b and 2c are waveform diagrams indicating the operation of the circuit of FIG. 1.
Figure 2B:
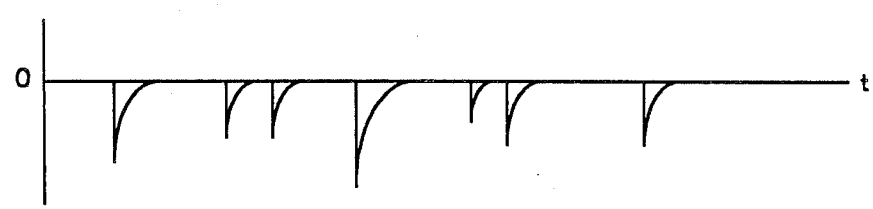
Figure 2C:
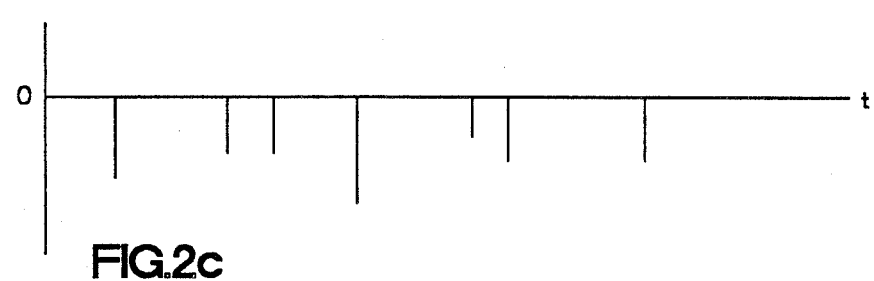

The operation of the circuit of FIG. 1 will become more apparent with reference to FIGS. 2a, 2b and 2c. With particular reference to FIG. 2a, the photomultiplier tube pulse signal on line 16 (with diode 24 not connected) is illustrated, such pulse signal being constituted by the "dark current" of the photomultiplier tube 14 and a series of varying amplitude pulses generated by impinging radiation on the scintillator element 12. The amplitude of the pulses varies in a known manner in accordance with the energy level of the radiation events impinging on the scintillator 12. The frequency of the pulses is indicative of the events occurring as a function of time.

It is well recognized in the art that a photomultiplier tube 14 has a direct current noise component known as "dark current" which is defined as the anode current measured without photocathode illumination of the tube 14. The "dark current" of the photomultiplier tube 14 is the thermionic noise of the tube 14. The present inventor has recognized that in measuring low level environmental radiation with a detector 10 that generates a pulse signal is indicated in FIG. 2a, the "dark current" noise component of such pulse signal needs to be eliminated or otherwise compensated for. It should be noted that while the detector 10 as illustrated includes a scintillator element 12 in combination with a photomultiplier tube 14, it is clearly contemplated that other detectors similar in function to the detector 10 could be utilized in practicing the present invention. For example, a solid state type radiation detector could be used in place of the scintillator 12 and photomultiplier tube 14. Such a solid state detector could provide a pulse signal which would have as a component a direct current noise component not caused by impinging radiation events. Thus, such a noise component would be analogous to the "dark current" of the photomultiplier tube 14.

With reference to FIG. 2b, the effect of capacitor 20 on the signal from the photomultiplier tube 14 can be seen. The capacitor 20 functions as a means for blocking the direct current noise component (i.e. the "dark current"- see FIG. 2a) so as to filter from the photomultiplier tube pulse signal the direct current noise component wherein the remaining portion of the pulse signal (as illustrated in FIG. 2a) can be processed to indicate the average energy fluence of the detected impinging events as a function of time. FIG. 2b (shown with diode 24 not connected) indicates that only the pulse portions indicative of impinging events are provided to the diode 24 and differentiating resistor 22 wherein the input 28 of the operational amplifier 26 has applied to it the leading edges of the negative going pulses as illustrated in FIG. 2c.

It can be seen and will be recognized by those in the art that the current pulse edges of FIG. 2c have varying amplitudes and it is these varying amplitudes that are in effect integrated or averaged by the operational amplifier 26 functioning as a conventional current-to-voltage converter so as to provide to the meter 34 a direct current signal whose amplitude indicates the average energy of the detected impinging events on the detector 10 as a function of time. It will be recognized that because of the capacitor 20, which functions as a direct current blocking element, the meter 34, as it is driven by the charge pump type rate meter circuit (constituted by the operational amplifier 26 and its associated components) will indicate the environmental radiation level or dosage without such measurement being distorted by the "dark current" noise component generated by the photomultiplier tube 14. Thus, the op amp with its associated components functions as means for processing the pulse signal filtered via the capacitor 20 to provide a direct current signal whose amplitude is indicative of the average energy fluence of said detected impinging events as a function of time. For example, the meter 34 will indicate environmental radiations in terms of microrems per hour in the range of 0-200 $\mu$rem/h.

The present invention incorporated into the circuit of FIG. 1 has been shown to be highly accurate and reliable. Also, it easily lends itself to incorporation into a small, lightweight portable environmental radiation measuring instrument.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advised by the invention.

What is claimed is:

1. A device for measuring low level environmental radiation, for example in the 0-200 $\mu$rem/h or equivalent range, comprising:

a detector on which ionizing radiation can impinge, the detector, in response to impinging radiation events, providing a pulse signal indicative of said detected impinging events as a function of time and indicative of the energy of each of said detected impinging events, said pulse signal including a direct current noise component not caused by said impinging radiation events; and means for blocking said direct current noise component so as to filter from said pulse signal said direct current noise component, a remaining portion of said pulse signal indicating the average energy fluence of said detected impinging events as a function of time.

2. A device according to claim 1, wherein said detector includes a scintillator element optically coupled to a photomultiplier tube having an output providing said pulse signal, said direct current noise component being constituted by the "dark current" of the photomultiplier tube.

3. A device of measuring low level environmental radiation, for example in the 0-200 $\mu$rem/h or equivalent range, comprising:

a detector on which ionizing radiation can impinge, the detector, in response to impinging radiation events, providing a pulse signal indicative of said detected impinging events as a function of time and indicative of the energy of each of said detected impinging events, said pulse signal including a direct current noise component not caused by said impinging radiation events; and a capacitor for blocking said direct current noise component so as to filter from said pulse signal said direct current noise component, a remaining portion of said pulse signal being integrated to provide as a function of time a direct current signal indicative of the average energy fluence of said detected impinging events as a function of time.

4. A device according to claim 3, including an operational amplifier configured as a current-to-voltage converter, said amplifier integrating said remaining portion of said pulses applied to the input of said amplifier, the output of said amplifier providing said direct current signal indicating the average energy of said detected impinging events as a function of time.

5. A device for measuring low level environmental radiation, for example in the 0–200 $\mu$rem/h or equivalent range, comprising:

a scintillator element on which ionizing radiation can impinge, the scintillator element, in response to impinging radiation events, generating light pulses indicative of said impinging events as a function of time and indicative of the energy of each of said impinging events;

a photomultiplier tube optically coupled to said scintillator element so as to receive said light pulses, said photomultiplier tube, in response to said light pulses, providing a direct current pulse signal indicative of said detected impinging events as a function of time and indicative of the energy of each of said detected impinging events, said pulse signal including a "dark current" noise component not caused by said impinging radiation events;

means for processing said pulse signal to provide a direct current signal whose amplitude is indicative of the average energy fluence of said detected impinging events as a function of time; and direct current blocking means electrically connected between said photomultiplier tube and said processing means, said blocking means filtering from said pulse signal said "dark current" component wherein only a remaining portion of said pulse signal is applied to said processing means.

6. A device according to claim 5 wherein said direct current blocking means is a capacitor electrically connected in series relation between said photomultiplier tube and said processing means.

* * * * *